United States Patent
Bae

(10) Patent No.: US 11,695,179 B2
(45) Date of Patent: Jul. 4, 2023

(54) SECONDARY BATTERY

(71) Applicant: SAMSUNG SDI CO., LTD., Yongin-si (KR)

(72) Inventor: Sang Hoon Bae, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 442 days.

(21) Appl. No.: 16/462,677

(22) PCT Filed: Sep. 28, 2017

(86) PCT No.: PCT/KR2017/010820
§ 371 (c)(1),
(2) Date: May 21, 2019

(87) PCT Pub. No.: WO2018/097471
PCT Pub. Date: May 31, 2018

(65) Prior Publication Data
US 2020/0083494 A1 Mar. 12, 2020

(30) Foreign Application Priority Data
Nov. 22, 2016 (KR) .......................... 10-2016-0155897

(51) Int. Cl.
H01M 50/152 (2021.01)
H01M 50/107 (2021.01)
(Continued)

(52) U.S. Cl.
CPC ........ *H01M 50/152* (2021.01); *H01M 50/107* (2021.01); *H01M 50/159* (2021.01);
(Continued)

(58) Field of Classification Search
CPC ............. H01M 50/152; H01M 50/107; H01M 50/533; H01M 50/545; H01M 50/172; H01M 50/503; H01M 50/50
See application file for complete search history.

(56) References Cited

U.S. PATENT DOCUMENTS 6,524,739 B1* 2/2003 Iwaizono ............ H01M 50/572
429/61
6,861,174 B2* 3/2005 Wu ......................... H01M 6/08
429/174
(Continued)

FOREIGN PATENT DOCUMENTS

CN 1275249 A 11/2000
EP 1 026 761 A1 8/2000
(Continued)

OTHER PUBLICATIONS

Extended European Search Report dated May 19, 2020 of the European Patent Application No. 17873498.4 corresponding to this application.
(Continued)

*Primary Examiner* — Maria Laios
*Assistant Examiner* — Jordan E Berresford
(74) *Attorney, Agent, or Firm* — Lee IP Law, P.C.

(57) ABSTRACT

The present invention relates to a secondary battery in which a conductive cover, which is electrically connected to a case and has a flat part, is formed at an upper end of the case so as to facilitate welding of an electrode tab and enable space utilization to be maximized. According to one embodiment, disclosed is a secondary battery comprising: an electrode assembly; a case for accommodating the electrode assembly; a cap assembly which is coupled to an upper part of the case so as to seal the case, and has a terminal part; and a
(Continued)

conductive cover which is coupled to an upper part of the case and fixed to a lateral plate of the case.

18 Claims, 5 Drawing Sheets

(51) Int. Cl.
  *H01M 50/559* (2021.01)
  *H01M 50/179* (2021.01)
  *H01M 50/159* (2021.01)
  *H01M 50/536* (2021.01)
  *H01M 50/548* (2021.01)
(52) U.S. Cl.
  CPC ........ *H01M 50/179* (2021.01); *H01M 50/536* (2021.01); *H01M 50/548* (2021.01); *H01M 50/559* (2021.01)

(56) References Cited

U.S. PATENT DOCUMENTS

| | | | |
|---|---|---|---|
| 8,722,217 B2* | 5/2014 | Lee | H01M 10/0436 429/7 |
| 2005/0070164 A1* | 3/2005 | Mita | H01M 50/502 439/627 |
| 2008/0182168 A1 | 7/2008 | Byun et al. | |
| 2009/0004558 A1* | 1/2009 | Miyazaki | H01M 50/56 429/158 |
| 2009/0111017 A1 | 4/2009 | Kim | |
| 2011/0052939 A1 | 3/2011 | Kim et al. | |
| 2011/0177376 A1* | 7/2011 | Maguire | H01M 50/20 429/151 |
| 2011/0281144 A1 | 11/2011 | Yoon et al. | |
| 2013/0316202 A1 | 11/2013 | Bang et al. | |
| 2014/0038014 A1 | 2/2014 | Kwon et al. | |
| 2015/0140399 A1 | 5/2015 | Kwon et al. | |
| 2016/0240825 A1 | 8/2016 | Ro et al. | |

FOREIGN PATENT DOCUMENTS

| | | |
|---|---|---|
| EP | 1 139 462 A2 | 10/2001 |
| KR | 10-2005-0080514 A | 8/2005 |
| KR | 10-2009-0042535 A | 4/2009 |
| KR | 10-2009-0056027 A | 6/2009 |
| KR | 10-2009-0126094 A | 12/2009 |
| KR | 10-2010-0041463 A | 4/2010 |
| KR | 10-2011-0021208 A | 3/2011 |
| KR | 10-2011-0105952 A | 9/2011 |
| KR | 10-2012-0107371 A | 10/2012 |
| KR | 10-2013-0020589 A | 2/2013 |

OTHER PUBLICATIONS

International Search Report for PCT/KR2017/010820 filed on Sep. 28, 2017.

Chinese Office Action dated Jun. 3, 2021 for the Chinese Patent Application No. 201780071913.4 corresponding to this application.

* cited by examiner

SECONDARY BATTERY

CROSS-REFERENCE TO THE RELATED APPLICATION

This is the U.S. national phase application based on PCT Application No. PCT/KR2017/010820, filed Sep. 28, 2017, which is based on Korean Patent Application No. 10-2016-0155897, filed Nov. 22, 2016, the entire contents of all of which are hereby incorporated by reference.

TECHNICAL FIELD

The present invention relates to a secondary battery.

BACKGROUND ART

In general, a cylindrical secondary battery is configured such that electrode tabs are welded to its opposite sides (top and bottom portions) to draw positive and negative electrodes to the outside, respectively. In this case, however, since the electrode tabs are drawn out from the opposite sides, there is spatial limitation. Accordingly, in order to maximize design and space utilization efficiency, in recent years, there has been increasing demand for methods for drawing positive and negative electrodes to the outside by welding both of the positive and negative electrode tabs to one side (e.g., top end) of the cylindrical secondary battery. That is to say, the positive electrode tab is welded to a cap-up, and the negative electrode tab is welded to a top end of a case, thereby drawing both of the positive and negative electrode tabs from the top end of the secondary battery. However, a round beading part for fixing the electrode assembly with a gasket is formed at the top end of the case in the course of forming the case. Accordingly, it is difficult to weld the electrode tab to the round beading part.

Technical Problems to be Solved

The present invention provides a secondary battery, which can facilitate welding of an electrode tab and can maximize space utilization by forming a conductive cover electrically connected to a case and having a flat part at an upper part of the case.

Technical Solutions

In accordance with an aspect of the present invention, the above and other objects can be accomplished by providing a secondary battery including: an electrode assembly; a case for accommodating the electrode assembly; a cap assembly which is coupled to an upper part of the case so as to seal the case, and has a terminal part; and a conductive cover which is coupled to an upper part of the case and fixed to a lateral plate of the case.

The conductive cover may include: a flat part covering the upper part of the case and flatly formed; an extending part downwardly extending from the flat part; and a coupling part inwardly protruding from the extending part and contacting the lateral plate of the case.

A hole exposing the terminal part to the outside may be formed in the flat part.

The hole may have a larger diameter than the terminal part.

The coupling part may include a first region contacting the lateral plate of the case, and a second region positioned at opposite side of the first region and connecting the first region to the extending part.

The conductive cover may further include an electrode tab formed by cutting a portion of the flat part and bending the cut portion.

The conductive cover may further include an electrode tab formed by cutting a portion of the extending part and bending the cut portion.

The electrode assembly may include a first electrode, a second electrode and a separator interposed between the first electrode and the second electrode, wherein the terminal part is electrically connected to the first electrode, and the conductive cover is electrically connected to the second electrode.

The secondary battery may further include an insulation member positioned between the case and the flat part and having a hole exposing the terminal part.

The insulation member may include an insulating adhesive tape.

Advantageous Effects

As described above, in the secondary battery according to an embodiment of the present invention, a conductive cover electrically connected to a case and having a flat part is formed at a top end of the case, thereby facilitating welding an electrode tab to the flat part. According to the present invention, since electrode tabs electrically connected to a first electrode and a second electrode in a cylindrical secondary battery, respectively, are both drawn out to one side, space utilization can be maximized.

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components; but do not preclude the presence or addition of one or more other features, numbers, steps, operations, elements, components, and/or groups thereof.

Figure 1:
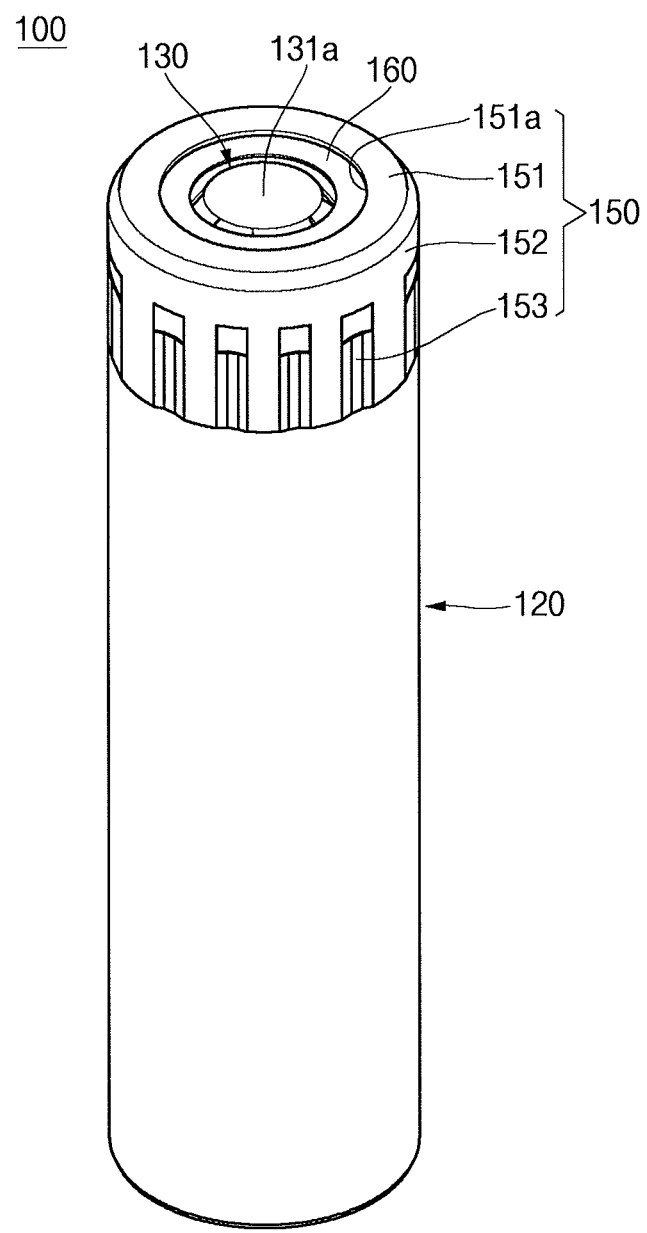
FIG. 1 is a perspective view of a secondary battery according to an embodiment of the present invention.
Figure 2:
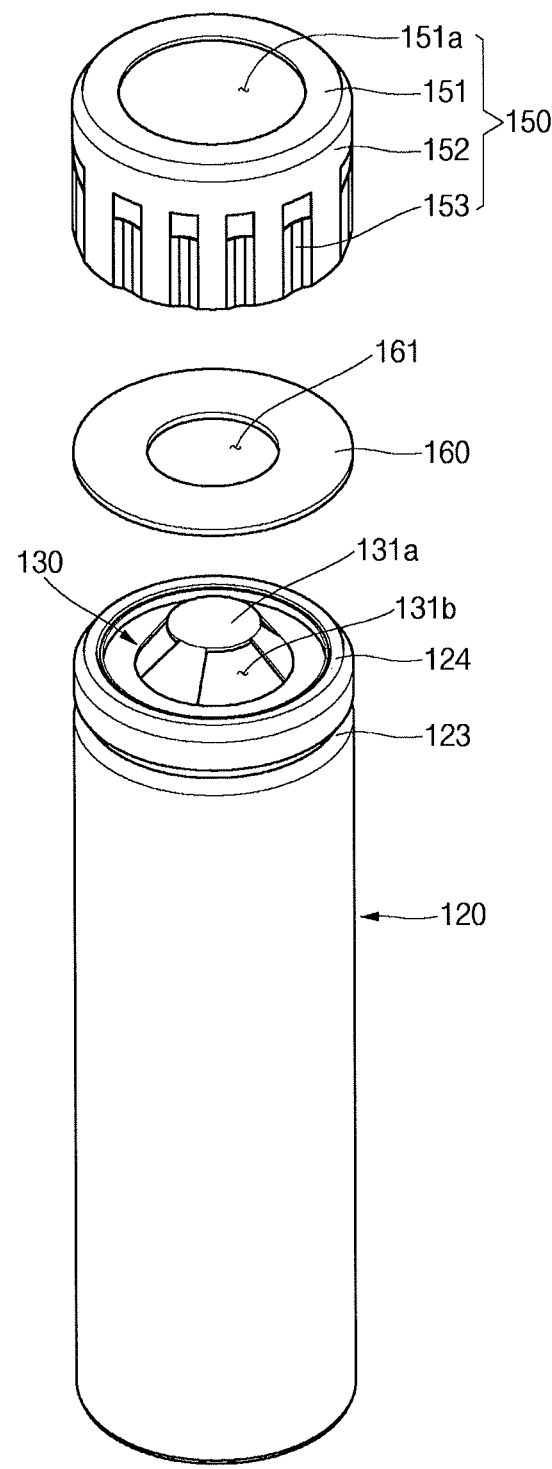
FIG. 2 is an exploded perspective view of the secondary battery according to an embodiment of the present invention.
Figure 3:
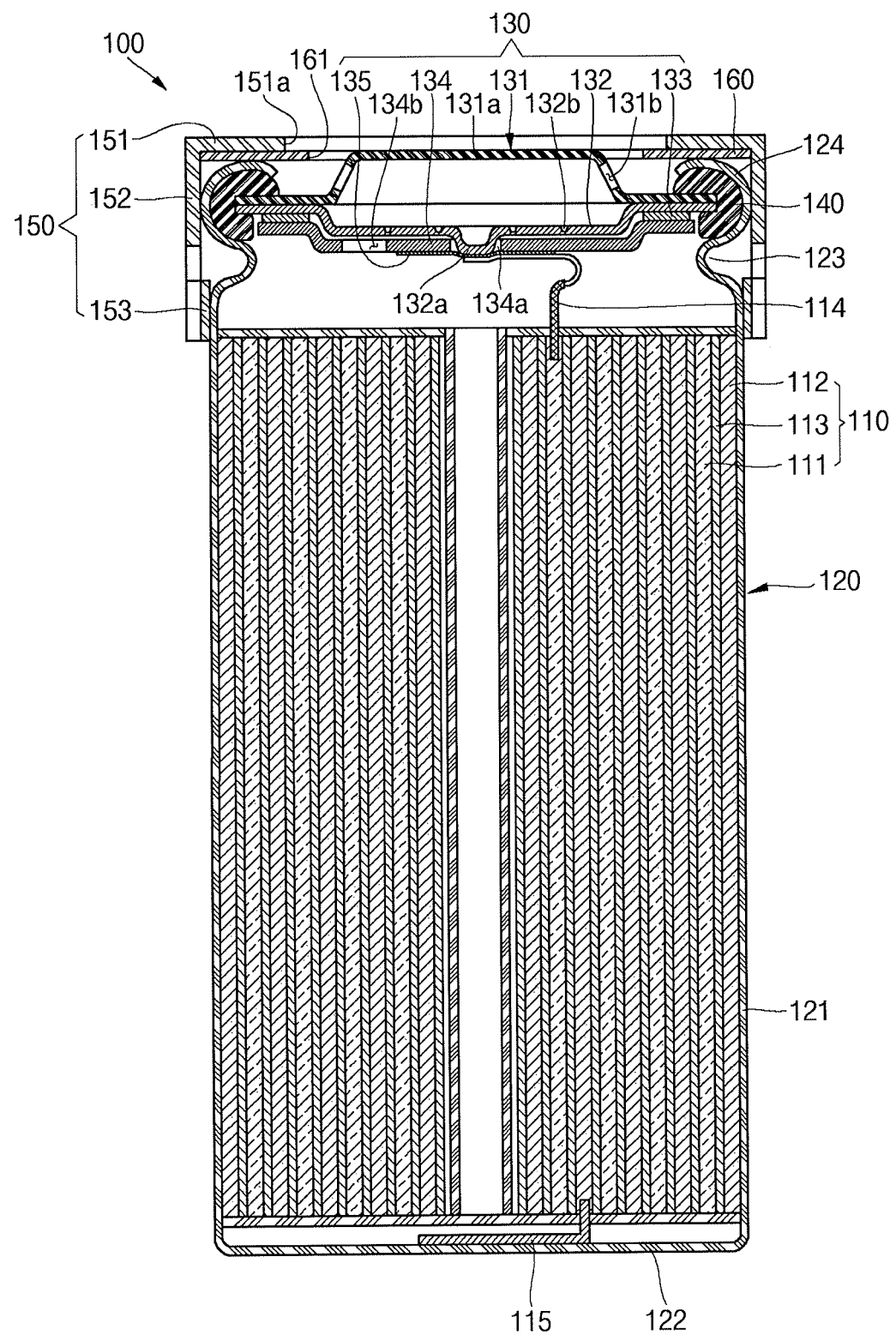
FIG. 3 is a cross-sectional view of the secondary battery according to an embodiment of the present invention.
Figure 4:
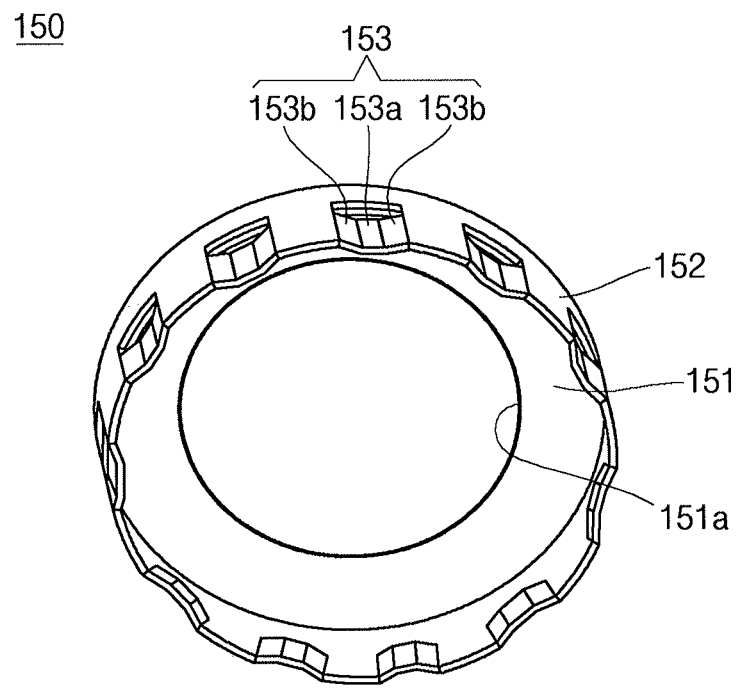
FIG. 4 is a perspective view of a conductive cover shown in FIG. 1.
Figure 5:
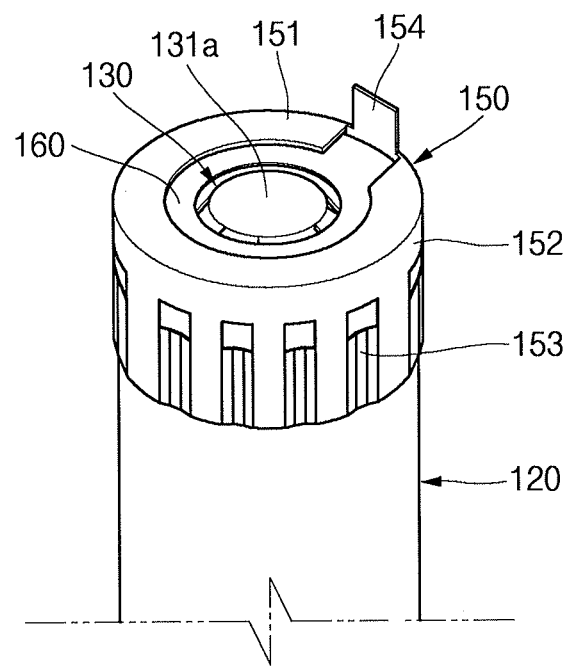
FIGS. 5 and 6 are perspective views of a variety of electrode tabs positioned on the conductive cover according to an embodiment of the present invention.
Figure 6:
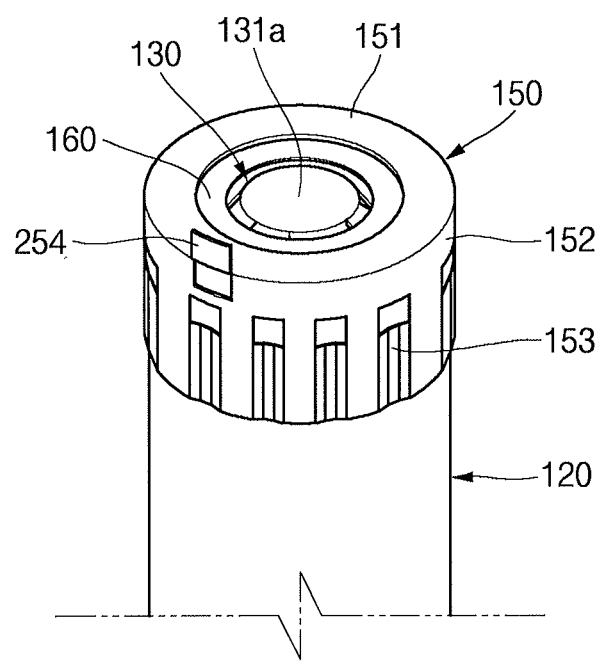

FIG. 1 is a perspective view of a secondary battery according to an embodiment of the present invention. FIG. 2 is an exploded perspective view of the secondary battery according to an embodiment of the present invention. FIG. 3 is a cross-sectional view of the secondary battery according to an embodiment of the present invention. FIG. 4 is a perspective view of a conductive cover shown in FIG. 1. FIGS. 5 and 6 are perspective views of a variety of electrode tabs positioned on the conductive cover according to an embodiment of the present invention.

Referring to FIGS. 1 to 4, the secondary battery 100 according to an embodiment of the present invention includes an electrode assembly 110, a case 120 accommodating the electrode assembly 110, a cap assembly 130 coupled to a top opening of the case 120, a gasket 140 allowing the case 120 and the cap assembly 130 to be tightly contacted with each other, a conductive cover 150 coupled to an upper part of the case 120 and the cap assembly 130, and an insulation member 160 positioned between the upper part of the case 120 and the conductive cover 150.

The electrode assembly 110 includes a first electrode 111, a second electrode 112, and a separator 113 interposed between the first electrode 111 and the second electrode 112. The electrode assembly 110 may be formed by winding a stacked structure of the first electrode 111, the separator 113 and the second electrode 112 in a jelly-roll configuration. Here, the first electrode 111 may function as a positive electrode, and the second electrode 112 may function as a negative electrode. A first electrode tab 114 is connected to the cap assembly 130 at an upper part of the electrode assembly 110, and a second electrode tab 115 is connected to a bottom plate 122 of the case 120 at a lower part of the electrode assembly 110.

The first electrode 111 is formed by coating a first electrode active material, such as a transition metal oxide, on a first electrode current collector formed of a metal foil made of, for example, aluminum. A first electrode non-coating portion that is not coated with the first electrode active material is formed on the first electrode 111, and the first electrode tab 114 is attached to the first electrode non-coating portion. One end of the first electrode tab 114 is electrically connected to the first electrode 111, and the other end of the first electrode tab 114 protrudes upwardly from the electrode assembly 110 to then be electrically connected to the cap assembly 130.

The second electrode 112 is formed by coating a second electrode active material, such as graphite or carbon, on a second electrode current collector formed of a metal foil made of, e.g., copper or nickel. A second electrode non-coating portion that is not coated with the second electrode active material is formed on the second electrode 112, and the second electrode tab 115 is attached to the second electrode non-coating portion. One end of the second electrode tab 115 is electrically connected to the second electrode 112, and the other end of the second electrode tab 115 protrudes downwardly from the electrode assembly 110 to then be electrically connected to the bottom plate 122 of the case 120.

The separator 113 is positioned between the first electrode 111 and the second electrode 112 to prevent an electrical short while allowing lithium ions to move. The separator 113 may include polyethylene (PE), polypropylene (PP), or a composite film of PE and PP.

The case 120 includes a lateral plate 121 shaped of a cylinder having a predetermined diameter to produce a space in which the electrode assembly 110 is accommodated, and the bottom plate 122 sealing a bottom portion of the lateral plate 121. The top opening of the case 120 is opened to seal the case 120 after the electrode assembly 110 is inserted into the case 120. In addition, a beading part 123 for preventing movement of the electrode assembly 110 is formed at the upper part of the case 120. In addition, a crimping part 124 for fixing the cap assembly 130 and the gasket 140 is formed at the topmost end of the case 120. The crimping part 124 is formed to have a substantially round shape in the course of a forming process for fixing the cap assembly 130 with the gasket 140, and protrudes outwardly more than the lateral plate 121 of the case 120.

The cap assembly 130 includes a cap-up 131, a safety vent 132 installed at a lower part of the cap-up 131, a cap-down 134 installed at a lower part of the safety vent 132, an insulator 133 interposed between the safety vent 132 and the cap-down 134, and a sub-plate 135 fixed to a bottom surface of the cap-down 134 to then be electrically connected to the first electrode tab 114.

The cap-up 131 includes a terminal part 131a having an upwardly convex portion positioned at its center, and the terminal part 131a is electrically connected to an external circuit. The terminal part 131a is electrically connected to the first electrode tab 114 and may function as a positive electrode, for example. The cap-up 131 has gas exhaustion holes 131b formed to provide paths for exhausting internal gases generated in the case 120 to the outside. The cap-up 131 is electrically connected to the electrode assembly 110 and transfers electric current generated in the electrode assembly 110 to the external circuit.

The safety vent 132 is shaped of a circular plate corresponding to the cap-up 131. A downwardly protruding protrusion part 132a is formed at the center of the safety vent 132. The safety vent 132 is electrically connected to the sub-plate 135 fixed to the bottom surface of the cap-down 134 using the protrusion part 132a passing through a throughhole 134a of the cap-down 134. Here, the protrusion part 132a of the safety vent 132 and the sub-plate 135 may be welded to each other by laser welding, ultrasonic welding, resistance welding or equivalents thereof. In addition, a notch 132b that guides rupture of the safety vent 132 is formed at an outer periphery of the protrusion part 132a.

The outer periphery of the safety vent 132 is installed to be tightly adhered to portions of the cap-up 131, except for the terminal part 131a. That is to say, the outer periphery of the safety vent 132 and the outer periphery of the cap-up 131 may come into contact with each other. When an abnormal internal pressure is generated in the case 120, the safety vent 132 may release internal gases while cutting off the current. If the internal pressure of the case 120 exceeds an operating pressure of the safety vent 132, the protrusion part 132a of the safety vent 132 rises upwardly by the gases released through a gas exhaustion hole 134b of the cap-down 134 to then be electrically disconnected from the sub-plate 135. Here, the sub-plate 135 is electrically disconnected from the safety vent 132 as a welded portion of the protrusion part 132a is ripped apart. Then, if the internal pressure of the case 120 exceeds a rupture pressure higher than the operating pressure of the safety vent 132, the notch 132b may be ruptured, thereby allowing the safety vent 132 to prevent the secondary battery 100 from exploding.

The insulator 133 is interposed between the safety vent 132 and the cap-down 134 to insulate the safety vent 132 and the cap-down 134 from each other. In detail, the insulator 133 is interposed between the outer periphery of the safety vent 132 and the outer periphery of the cap-down 134. The insulator 133 may be formed of a resin material, such as polyethylene (PE), polypropylene (PP), or polyethylene terephthalate (PET).

The cap-down 134 is shaped of a circular plate. The throughhole 134a is formed at the center of the cap-down 134, and the protrusion part 132a of the safety vent 132 passes through the throughhole 134a. In addition, the gas exhaustion hole 134b is formed at one side of the cap-down 134. When an excessive internal pressure is generated in the case 120, the gas exhaustion hole 134b may function to release internal gases to the outside. Here, the protrusion part 132a of the safety vent 132 rises due to the gases released through the gas exhaustion hole 134b, so that the protrusion part 132a is separated from the sub-plate 135.

The sub-plate 135 is positioned under the cap-down 134. The sub-plate 135 is welded to a region between the protrusion part 132a of the safety vent 132 passing through the throughhole 134a of the cap-down 134 and the first electrode tab 114. Accordingly, the sub-plate 135 electrically connects the first electrode tab 114 and the safety vent 132 to each other.

The gasket 140 is installed at the top opening of the case 120. That is to say, the gasket 140 is brought into close contact with regions between the outer peripheries of the cap-up 131 and the safety vent 132 and the top opening of the case 120. The gasket 140 may prevent the cap assembly 130 from being separated from the case 120.

The conductive cover 150 is coupled to the upper part of the case 120 coupled to the cap assembly 130. The conductive cover 150 includes a flat part 151 shaped of a substantially planar circle, an extending part 152 downwardly extending from the flat part 151 and covering the upper part of the case 120, and a coupling part 153 inwardly protruding to the extending part 152 to be coupled to the lateral plate 121 of the case 120. The conductive cover 150 is made of a metal and is electrically connected to the case 120. Therefore, the conductive cover 150 may function as an electrode having the same polarity with the case 120 (e.g., a negative electrode). In addition, the conductive cover 150 covers the crimping part 124 positioned at the topmost part of the case 120, thereby facilitating welding of an electrode tab at an edge part of the secondary battery 100.

The crimping part 124 is generally formed to have a roughly round shape during the forming process of the case 120. Therefore, since the round crimping part 124 has a narrow space for welding and bubbles may be generated during welding, welding failures may be undesirably generated. Hence, according to the present invention, the conductive cover 150 covering the crimping part 124 and having a flat upper part is coupled to the upper part of the case 120, welding of the electrode tab can be facilitated.

The flat part 151 is substantially planar and is shaped of a circular plate. The flat part 151 is mounted on the upper part of the case 120 and covers the upper part of the case 120. In addition, a central hole 151a is formed at the center of the flat part 151, and the central hole 151a exposes the terminal part 131a of the cap-up 131. The central hole 151a has a larger diameter than the terminal part 131a. Therefore, the flat part 151 is electrically insulated from the cap-up 131. Consequently, the flat part 151 is positioned to correspond to the outer periphery of the cap-up 131 to cover the crimping part 124. In such a manner, since the flat part 151 is flatly formed while covering the crimping part 124, and is electrically connected to the case 120, the electrode tab can be easily welded to the flat part 151.

The extending part 152 downwardly extends a predetermined length from the flat part 151 and covers the lateral plate 121 of the case 120. Therefore, the extending part 152 is shaped of a cylinder having a predetermined diameter to correspond to the lateral plate 121 of the case 120. Here, since the extending part 152 is coupled to an exterior portion of the lateral plate 121, the diameter of the extending part 152 is larger than that of the lateral plate 121. In addition, the extending part 152 covers the beading, part 123 of the case 120. The coupling part 153 is formed to protrude inwardly to the extending part 152, that is, toward the lateral plate 121 of the case 120.

The coupling part 153 includes a plurality of coupling parts formed to be spaced a predetermined distance apart from the extending part 152. The coupling part 153 is a portion inwardly protruding from the extending part 152 and substantially contacts the lateral plate 121 of the case 120. In addition, the coupling part 153 is coupled to the case 120 in an interferential fit manner to prevent the conductive cover 150 from being separated from the case 120. That is to say, the coupling part 153 may fix the conductive cover 150 to the case 120. In addition, the coupling part 153 is positioned under the beading part 123. Therefore, since the coupling part 153 inwardly protruding to the extending part 152 is hung on the crimping part 124 positioned at an upper part of the beading part 123 even if the conductive cover 150 is pulled, the conductive cover 150 is not separated from the case 120.

The coupling part 153 includes a first region 153a inwardly protruding from the extending part 152 and contacting the lateral plate 121 of the case 120, and a second region 153b positioned at opposite sides of the first region 153a and connecting the first region 153a and the extending part 152. The first region 153a is substantially flatly formed. The second region 153b is slantingly formed to connect the first region 153a inwardly protruding from the extending part 152 to the extending part 152.

A separate electrode tab may be directly welded to the conductive cover 150. Alternatively, as shown in FIG. 5, a portion of the conductive cover 150 may be cut to be used as an electrode tab. That is to say, the conductive cover 150 may further include an electrode tab 154 positioned in the flat part 151. The electrode tab 154 may be formed to upwardly protrude from the conductive cover 150 by cutting a portion of the flat part 151 and bending the cut portion 90 degrees. That is to say, the electrode tab 154 is formed to be perpendicular to the flat part 151. Therefore, a bus bar or an external terminal may be electrically connected to the electrode tab 154.

In addition, as shown in FIG. 6, an electrode tab 254 may be formed by cutting a portion of the extending part 152 of the conductive cover 150. The electrode tab 254 may be formed to upwardly protrude from the conductive cover 150 by cutting a portion of the extending part 152 and bending the cut portion 180 degrees. Therefore, the electrode tab 254 is formed to be perpendicular to the flat part 151.

The insulation member 160 is positioned between the upper part of the case 120 and the conductive cover 150. In detail, the insulation member 160, which is positioned between the crimping part 124 and the flat part 151, prevents the flat part 151 from being shorted to the cap-up 131. That is to say, the insulation member 160 may be positioned on a bottom surface of the flat part 151. In addition, the insulation member 160 is shaped of a ring and has a wider area than the flat part 151. That is to say, the insulation member 160 has a hole 161 positioned at its center to expose the terminal part 131*a* of the cap-up 131 to the outside, and the hole 161 is smaller than the central hole 151*a* of the flat part 151. In addition, the insulation member 160 is formed of, for example, an insulating adhesive tape, which is made of polypropylene (PP), polyimide (PI) or equivalents thereof. Therefore, the insulation member 160 may prevent an electrical short from occurring between the conductive cover 150 and the cap-up 131 while fixing the conductive cover 150 to the case 120.

As described above, in the secondary battery according to an embodiment of the present invention, a conductive cover electrically connected to a case and having a flat part is formed at an upper part of the case, thereby easily welding an electrode tab to the flat part. According to the present invention, since electrode tabs electrically connected to a first electrode and a second electrode in a cylindrical secondary battery, respectively, are both drawn out to one side, space utilization can be maximized.

In addition, in the secondary battery according to an embodiment of the present invention, an insulation member is formed between the case and the conductive cover, thereby preventing an electrical short from occurring between the conductive cover and a cap-up while fixing the conductive cover to the case.

In addition, in the secondary battery according to an embodiment of the present invention, a conductive cover is provided, the conductive cover including a flat part, an extending part downwardly extending from the flat part, and a coupling part inwardly protruding to the extending part, thereby preventing the conductive cover from being separated from the case.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery, comprising:
an electrode assembly;
a case for accommodating the electrode assembly, the case including:
a bottom,
a lateral plate connected to the bottom and extending perpendicularly from the bottom in an upward direction, and
a beading part above the lateral plate;
a cap assembly which is coupled to an upper part of the case so as to seal the case, and has a terminal part;
a conductive cover which is coupled to the upper part of the case and fixed to the lateral plate of the case, the conductive cover including:
a flat part covering the upper part of the case,
an extending part extending downwardly from the flat part, the extending part covering laterally the beading part while being laterally spaced apart from the beading part, and
a plurality of coupling parts protruding inwardly from the extending part, an entirety of each of the plurality of coupling parts protruding inwardly relative to the extending part and contacting the lateral plate of the case under the beading part, and the plurality of coupling parts being arranged along an inner circumferential surface of the extending part; and
a crimping part securing the cap assembly, the crimping part extending from the beading part and contacting an inner surface of the extending part, such that the crimping part extends laterally toward the extending part beyond the lateral plate to overlap a top of the coupling part.

2. The secondary battery as claimed in claim 1, wherein:
the flat part of the conductive cover has a flat shape, and
the extending part of the conductive cover extends continuously along a circumference of the terminal part and extends between facing sides of adjacent portions of the plurality of coupling parts.

3. The secondary battery as claimed in claim 2, wherein a hole exposing the terminal part to the outside is in the flat part.

4. The secondary battery as claimed in claim 3, wherein the hole has a larger diameter than the terminal part.

5. The secondary battery as claimed in claim 1, wherein each of the plurality of coupling parts includes:
a first region contacting the lateral plate of the case, and
second regions positioned at opposite sides of the first region along a circumference of the terminal part, the second regions connecting the first region to the extending part.

6. The secondary battery as claimed in claim 2, wherein the conductive cover further includes an electrode tab that includes a bent portion of the flat part.

7. The secondary battery as claimed in claim 2, wherein the conductive cover further includes an electrode tab that includes a bent portion of the extending part.

8. The secondary battery as claimed in claim 1, wherein the electrode assembly includes a first electrode, a second electrode and a separator interposed between the first electrode and the second electrode, wherein the terminal part is electrically connected to the first electrode, and the conductive cover is electrically connected to the second electrode.

9. The secondary battery as claimed in claim 2, further comprising an insulation member positioned between the case and the flat part and having a hole exposing the terminal part.

10. The secondary battery as claimed in claim 9, wherein the insulation member includes an insulating adhesive tape.

11. The secondary battery as claimed in claim 1, wherein, in a cross-sectional view, a portion of the extending part is parallel to a portion of each of the plurality of coupling parts, the coupling part being horizontally offset relative to the extending part.

12. The secondary battery as claimed in claim 11, wherein, in the cross-sectional view, the extending part and the plurality of coupling parts have a non-overlapping relationship in a vertical direction.

13. The secondary battery as claimed in claim 11, wherein an outer diameter of the lateral plate, where it contacts the plurality of coupling parts, is smaller than an outer diameter of the upper part of the case, where it contacts the extending part.

14. The secondary battery as claimed in claim 1, wherein the extending part of the conductive cover continuously covers a lateral side of the cap assembly and an upper portion of the lateral plate without openings therein.

15. The secondary battery as claimed in claim 5, wherein:
- in a cross-sectional view, the first region is parallel with the extending part and flush against the lateral plate, and
- each of the second regions extends from the first region to the extending part at an oblique angle relative to the first region.

16. The secondary battery as claimed in claim 15, wherein the first region with the second regions defines a concave protrusion protruding inwardly relative to the extending part.

17. The secondary battery as claimed in claim 1, wherein the plurality of coupling parts are conductive and in direct contact with the extending part.

18. The secondary battery as claimed in claim 1, wherein the plurality of coupling parts, the extending part, and the flat part of the conductive cover are formed of metal and in direct contact with each other.

\* \* \* \* \*